Figure 1:
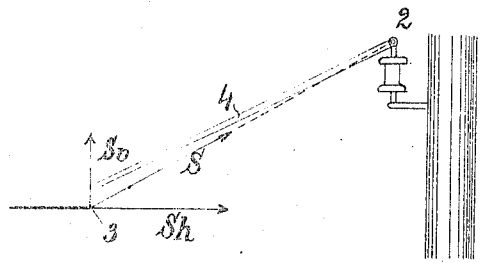

C. DE KANDÓ.
DEVICE FOR SUPPORTING TROLLEY WIRES.
APPLICATION FILED MAR. 26, 1907.

1,089,415.

Patented Mar. 10, 1914.
2 SHEETS—SHEET 1.

Witnesses:
W. A. Pauling
J. E. Hardenbergh, Jr.

Inventor
Coloman de Kandó
by Gifford & Bull
Attys

UNITED STATES PATENT OFFICE.

COLOMAN DE KANDÓ, OF BUDAPEST, AUSTRIA-HUNGARY, ASSIGNOR TO GEORGE WESTINGHOUSE, OF PITTSBURGH, PENNSYLVANIA.

DEVICE FOR SUPPORTING TROLLEY-WIRES.

1,089,415.  Specification of Letters Patent.  Patented Mar. 10, 1914.

Application filed March 26, 1907. Serial No. 364,565.

*To all whom it may concern:*

Be it known that I, COLOMAN DE KANDÓ, a subject of the King of Hungary, engineer, residing at Budapest, in the Empire of Austria-Hungary, have invented new and useful Improvements in Devices for Supporting Trolley-Wires; and I do hereby declare the following to be a full, clear, and exact description of the same.

This invention relates to supporting or steadying means for trolley wires and has for an object to produce means which will prevent lateral displacement of the supported trolley wire and will permit the wire to move in a vertical or an approximately vertical plane under the influence of upward pressure, as for example, the pressure imparted by the trolleys.

A further object is to produce a supporting or steadying means for trolley wires which is adapted to be employed on curves and which will not change its position when subjected to variations in the tension or pull of the trolley wires and which will yield to the upward pressure of the trolleys in such a manner that the wire will move vertically or approximately so.

These and other objects I attain by means of the apparatus illustrated in the drawings accompanying this application and forming a part thereof.

Figures 2, 3:
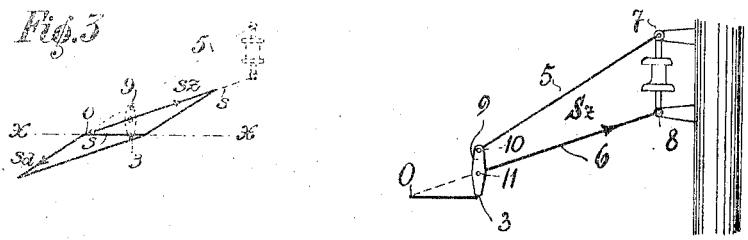
Figures 4, 5:
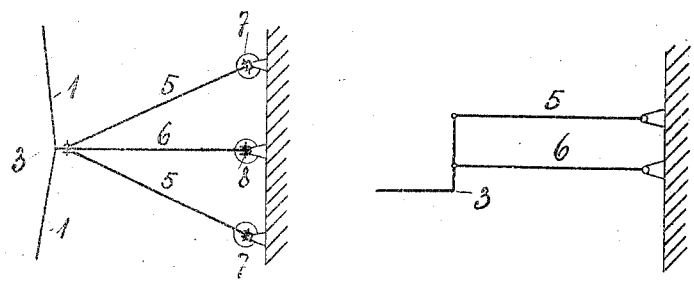
Figure 6:
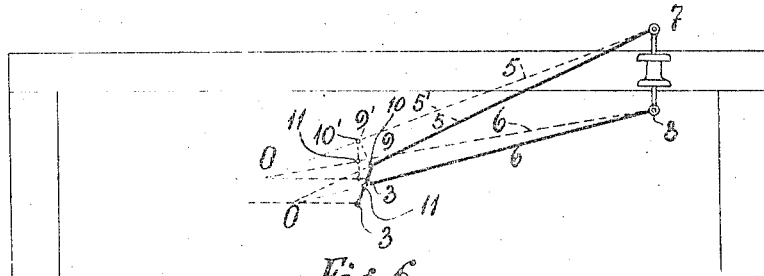
Figure 7:
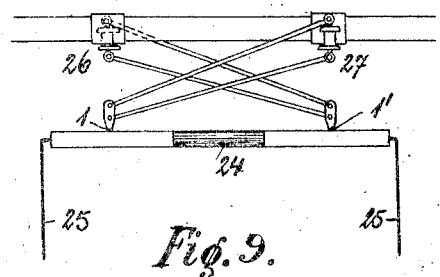
Figure 8:
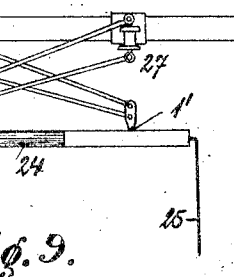
Figure 9:
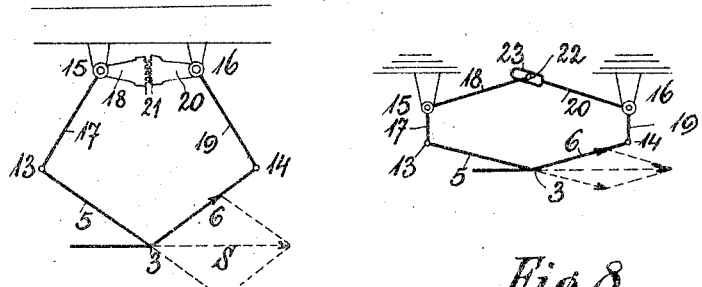

In the drawings Figure 1 is a diagrammatic illustration of the ordinary means employed for supporting or steadying trolley wires on curves and is shown in connection with a force diagram. Fig. 2 is a diagrammatic illustration of a supporting device embodying my invention. Fig. 3 is a force diagram illustrating the directions and magnitudes of the force acting on the device illustrated in Fig. 2. Fig. 4 is a plan view of a modified form of the device illustrated in Fig. 2. Fig. 5 is a modified arrangement of the device illustrated in Fig. 2. Fig. 6 is a diagrammatic illustration in connection with force diagrams and illustrates the operation of the device shown in Fig. 2, when subjected to variations of upward pressure as, for example, pressures transmitted to it by the contact device of a trolley. Fig. 7 and Fig. 8 are more or less diagrammatic illustrations of modifications of my invention. Fig. 9 illustrates an arrangement of the device illustrated in Fig. 2 which may be employed in supporting or steadying trolley wires in a double wire system.

Referring to Fig. 1: The trolley wire 1 is stretched and is held at the point 3, where the change in direction of the wire takes place on a curve, by a rod 4 pivotally mounted about a joint or support 2. The rod 4 is inclined so as to avoid being struck by the contact device of a trolley, this arrangement being necessary because of the construction of certain contact devices now employed. The rod 4 is arranged to support the wire 1 against its lateral pull, but since the stress in it must necessarily be in the direction of the rod, the rod must also exert a vertical force upon the wire which may be represented by $Sv$ in the force diagram. The stress or force S necessarily has a horizontal component equal to some value such as $Sh$ as shown in the diagram, and the system is held in equilibrium by the tension or the reactive force of the trolley wire. As soon as the tension on the trolley wire varies due, for example, to fluctuations of temperature, the condition of equilibrium is disturbed and the system in rearranging itself to meet the new conditions will assume a new position of equilibrium in which the direction of the force S, and incidentally of the rod 4, will come nearer to or farther away from the horizontal. This movement of the rod 4 will vary the position of the point of support 3 of the trolley wire by raising it or lowering it above or below the original position and by moving it laterally to one side or the other of the original position. This resulting motion of the trolley wire 1 is objectionable for obvious reasons and is obviated by my invention by providing, instead of one rod, pivoted rods which are simultaneously subjected to compression and tension and which are so arranged that the point of support 3 of the wire 1 moves in an approximately rectilinear vertical line when the wire is subjected to vertical force such for example as the upward pressure of the trolley. The rods are so arranged that the resultants of the compression and tension force acting on them intersect the resultant of the horizontal forces acting on the trolley wire at a point exactly or approximately on a level with the point of support 3 of the trolley wire. With this arrangement, the resultant of the forces acting on the rods of the supporting or steadying device of my invention may be maintained in a horizontal direction so that variations in the tension of the trolley wire 1 cannot result in a vertical change in position of the wire.

The device illustrated in Fig. 2 consists of a rod 5 pivoted at 7 on a supporting member, a rod 6 pivoted at 8 below the pivot point 7 of the rod 5, and a lever 9 to which the rods 5 and 6 are respectively pivotally connected at 10 and 11 and which connects the rods in a movable closed system. The point of support 3 of the trolley wire 1 is at the end of the lever 9 below the point of connection 11 of the rod 6. With this arrangement, the force due to the horizontal component of the tension of the wire 1 will subject the rod 5 to compression and the rod 6 to tension as shown by the diagram in Fig. 3. The device illustrated is not adapted to support the weight of the wire, but is merely adapted to hold the wire in place or support its lateral pull. The force exerted by the weight of the device has been neglected in the force diagram, since it is comparatively small. The direction and magnitude of the compression and tension forces in the respective rods are shown by the lines $Sd$ and $Sz$ respectively, and the lines of direction of these forces intersect at a point O which is situated in the horizontal plane $x$—$x$ of the point of support 3. The direction of the resultant of the forces $Sd$ and $Sz$ extends in the horizontal plane $x$—$x$ and, although it may vary in magnitude in accordance with variations of the lateral pull of the trolley wire, it will not vary in direction and will remain in the horizontal plane. Consequently, variations in the tension or pull of the wire 1 cannot effect or change the position of the point of support 3 and the steadying device will hold the wire in position and yet be capable of yielding to the upward pressure of the trolley.

In Fig. 4 I have disclosed a plan view of a modification of my invention in which a device similar in some respects to that shown in Fig. 2 is disclosed; the difference being that instead of one compression member or rod 5 there are two such rods 5. The point of support of the trolley wire is at the end of the lever 9 as in Fig. 2, and the position of the point O is determined by the intersection of the resultant compression forces acting on the rods 5, with the tension force on the rod 6 or, when there are several rods 6, a the resultant of the tension forces on those rods.

In Fig. 5 I have illustrated a modification of the device in which the rods 5 and 6 are parallel. With this arrangement, the point O of intersection of the forces acting on the rods is at infinity, but notwithstanding this it will be apparent from the construction that variations in the tension of the trolley wire will not tend to vary the position of the point of support 3.

It is possible to so proportion the dimensions of the rods 5 and 6 and the positions of the joints or points of support 7, 8, 10, and 11 that the point O of intersection of the resultant forces will be approximately maintained in the same horizontal plane with the point of support 3 of the trolley wire as the wire moves vertically in response to variations of the upward pressure imparted to it by the contact device of the trolley. This is shown in Fig. 6 by means of the figures shown in full line and dotted lines. The steadying device of Fig. 2 is shown in one position in the full lines and in a raised position in the dotted lines. It will be apparent from an inspection of this figure that the magnitude of the forces, acting on the device and resulting from the horizontal component of the pull of the trolley wire, will not be changed by the vertical movement of the wire nor will the equilibrium of the system be disturbed. The point of intersection O of the forces acting on the rods 5 and 6 is, at any position of the point of support 3, approximately on a level with the point of support 3.

The rods 5 and 6, as shown in Figs. 7 and 8, may be connected into a movable closed system in some other manner. In these figures I have illustrated the rods 5 and 6 hinged at 13 and 14 to bell-crank levers 17, 18 and 19, 20, which are pivoted to fixed pins or supports 15 and 16. The arms 18 and 20 of the bell-crank levers engage each other by means of a tooth segment 21 as shown in Fig. 7 or by means of the slot and pin 22 and 23 as illustrated in Fig. 8. With this arrangement, the point of support of the trolley wire will move in a vertical direction and the resultant of the forces in the rods 5 and 6 will always exist in a horizontal direction, and, consequently, the equilibrium of the closed system illustrated will not be disturbed by variations in the magnitude of the pull of the trolley wire.

When the tension device embodying my invention is employed for double wire trolley systems and a contact roller 24 as shown in Fig. 9 is used on the trolley, I prefer to arrange the tension devices 26 and 27 so that they cross each other. With this arrangement, the devices cannot be struck by the supporting rods 25 of the contact device 24 in case the contact device breaks, for the reason that the supporting devices are located between the rods 25.

What I claim is:—

1. A device for steadying trolley wires comprising, a linked structure having a plurality of members, one of which is subjected to a tension, and one to a compression strain, the device being so constructed that the lines of direction of the tension and compression forces acting on said members, intersect in the line of direction of the resultant of the horizontal forces on the trolley wire connected to the support.

2. In a steadying device for trolley wires, a closed system comprising relatively movable tension and compression members and a lever pivotally connected to said members and adapted to be connected to a trolley wire subjected to a pull having a horizontal lateral component, said system being so constructed that the direction of the said component of the tensional forces, to which the wire is subjected, passes through the point of intersection of the lines of direction of the forces acting on the compression and tension members.

3. In a steadying device for trolley wires, a closed system comprising relatively movable pivotally mounted tension and compression members and means secured thereto for engaging the trolley wire, said system being so constructed that the lines of direction of the forces acting on the compression and tension members intersect in the line of the horizontal lateral component of the forces transmitted by the wire to the point of connection of the wire with the device.

4. In a steadying device for trolley wires, a closed system comprising relatively movable tension and compression members and a member for engaging the trolley wire, said members being so arranged that the point of intersection of the lines of direction of the forces acting on the tension and compression members falls in the line of direction of the resultant of the tensional forces acting upon the point of connection of the trolley wire to the device.

5. In a steadying device for trolley wires, a closed system comprising a compression member, a tension member, and a substantially vertical lever pivotally connected at its upper end to said compression member, at an intermediate point to said tension member and secured at its lower end to a trolley wire subjected to a pull having a horizontal lateral component, said system being so arranged that the lines of direction of the forces acting on the compression and tension members intersect in the line of the horizontal lateral component of the forces acting on the point of connection of the trolley wire with the lever.

6. In a steadying device for trolley wires, the combination of two trolley wires, a steadying device for each wire composed of a plurality of pivotally connected rods inclined downwardly toward the plane of said trolley wires, the two steadying devices being so arranged that they cross each other.

In testimony whereof, I have signed name to this specification in the presence of two subscribing witnesses.

COLOMAN DE KANDÓ.

Witnesses:
EUGENE HARSANYE,
CHARLES EDWARD ZAHN.